May 20, 1969 R. L. LINEKER 3,445,121
REAR SEALS FOR JOURNAL BOXES
Filed Feb. 9, 1967 Sheet 1 of 3

INVENTOR
R. L. LINEKER

Featherstonhaugh & Co.
ATTORNEYS

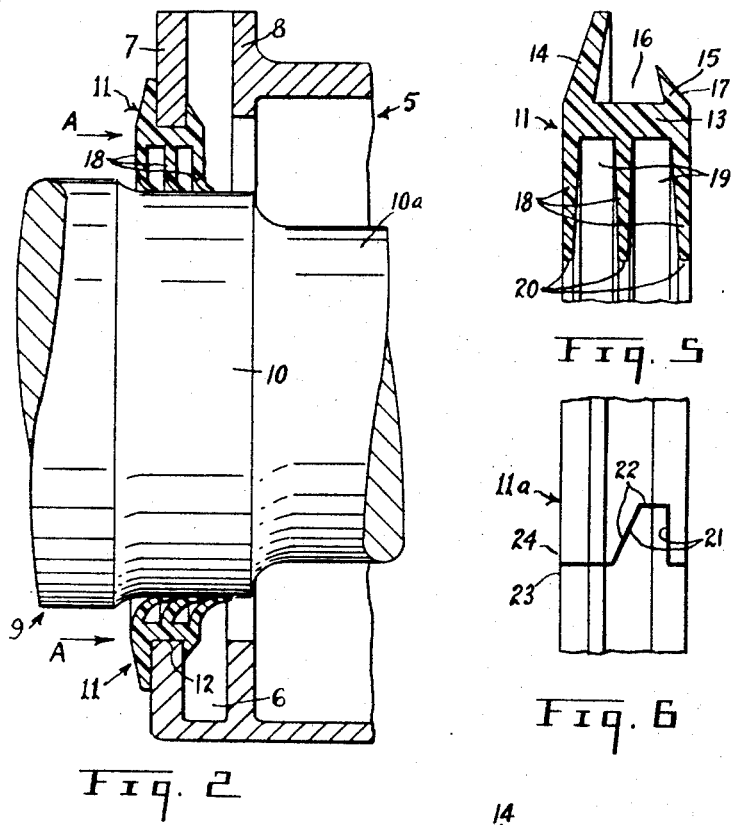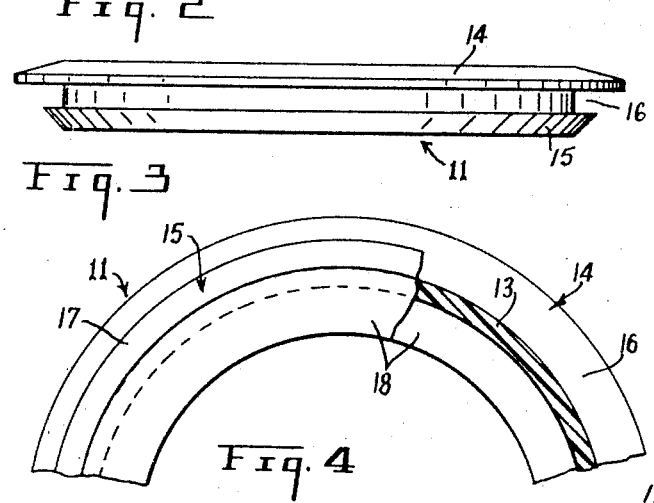

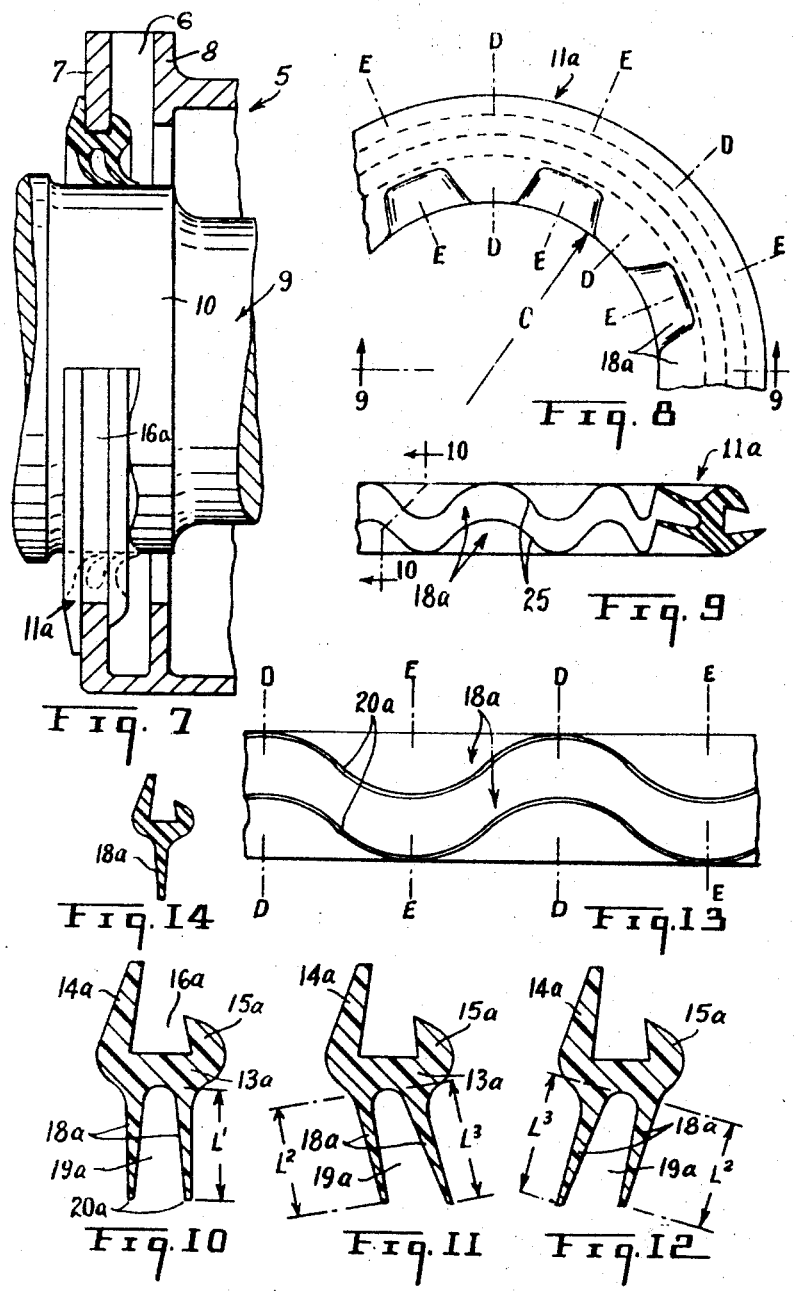

United States Patent Office 3,445,121
Patented May 20, 1969

3,445,121
REAR SEALS FOR JOURNAL BOXES
Robert L. Lineker, 116B Main Road,
Hudson, Quebec, Canada
Continuation-in-part of application Ser. No. 409,813,
Nov. 9, 1964. This application Feb. 9, 1967, Ser.
No. 629,839
Int. Cl. F16j *15/50, 15/54;* B61f *15/22*
U.S. Cl. 277—178                                9 Claims

ABSTRACT OF THE DISCLOSURE

A railroad car journal box having a rear wall with an opening through which the journal and adjacent dust guard seat portion of the car axle extends into the box. A labyrinth type seal of elastomeric material is mounted in the rear wall opening and is provided with a set of annular sealing ribs which project radially inwardly into a wiping seal contact with the dust guard seat portion of the axle. The sealing ribs define therebetween at least one annular dust pocket and are inwardly tapered in cross-section for optimum flexibility and sealing effect. In a modified embodiment, the sealing ribs are circumferentially undulated in the axial direction to obtain a circumferentially longer wiping contact in comparison to ribs which are circumferentially straight.

---

This application is a continuation-in-part of my co-pending United States application Ser. No. 409,813, filed Nov. 9, 1964.

This invention relates to railroad car journal box seals, particularly to a seal insertable from the rear of the journal box, and provides a multi-seal or labyrinth type seal on the dust guard portion of the axle.

Hitherto it has been the practice to insert seals into the dust guard well of the journal box. Due to the fact that the dust guard well is a rough, unmachined casting, it has not been possible to provide a seal, fitted into the dust guard well, which would provide sufficient flexibility to afford a satisfactory sealing action under all operating conditions effecting a maximum displacement of the car axle with respect to the journal box.

The present invention resides essentially in the provision of a rear seal formed from an elastomeric material which can be inserted in an axial direction from the rear side of the journal box and snap into secure anchorage on the peripheral edge of the rear wall opening in the dust guard well of the box. The rear seal is provided with a plurality of inwardly projecting annular sealing rings or ribs spaced axially apart. These sealing rings or ribs are relatively thin and flexible and have considerable radial depth permitting them to flex into a constant sealing engagement with the dust guard seat of the car axle. The invention also provides means whereby the rear seal is split radially and is provided with a peripherally disposed tongue and groove joint, so that the seal may be fitted around a car axle to engage the peripheral edge of the rear wall of the dust guard well without first having to remove the journal box from the journal. The engagement of the rear seal with the rear wall of the journal box ensures a positive closure of the tongue and groove joint in the split seal.

The object of the invention is to provide a rear seal for car journal boxes which can be fitted in place from the rear of the journal box.

A further object of the invention is to provide a rear seal which is securely anchored to the peripheral edge of the rear wall opening in the journal box.

A further object of the invention is to provide a rear seal having a plurality of radially disposed flexible sealing rings or ribs which accommodate themselves to maximum movement of the journal relative to the journal box.

A further object of the invention is to provide a rear seal in which the flexible sealing rings or ribs are axially spaced to form therebetween at least one dust pocket.

A further object of the invention is to provide a rear seal in which the flexible sealing rings or ribs are circumferentially undulated in the axial direction to provide a circumferentially longer wiping contact thereof with the car axle than if the ribs were circumferentially straight.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 2 is a fragmentary vertical sectional view thereof;

FIGURE 3 is an edge view of the seal per se;

FIGURE 4 is a fragmentary front elevational view of the seal, partly in section;

FIGURE 5 is an enlarged, fragmentary cross-sectional view of the seal, illustrating its moulded form before being applied to the journal box;

FIGURE 6 is an enlarged, fragmentary edge view of the seal, showing the split joint for application of the seal to the journal box while the axle is in place;

FIGURE 7 is a fragmentary vertical sectional view, similar to that in FIG. 2, but showing a modified embodiment of the seal;

FIGURE 8 is a fragmentary rear elevational view of the modified seal before application thereof to the journal box;

FIGURE 9 is a fragmentary sectional view, taken substantially in the plane of the line 9—9 in FIG. 8;

FIGURE 10 is a cross-sectional detail, taken substantially in the plane of the line 10—10 in FIG. 9 and showing the basic section of the seal;

FIGURE 11 is a cross-section of the seal taken in the plane of any of the lines D—D in FIG. 8;

FIGURE 12 is a cross-section of the seal taken in the plane of any of the lines E—E in FIG. 8;

FIGURE 13 is a view showing the development of the contour of the undulated sealing ribs at the diameter C in FIG. 8; and FIGURE 14 is a cross-sectional detail, similar to that shown in FIG. 10, but illustrating a modified embodiment with one annular sealing rib.

Figure 1:
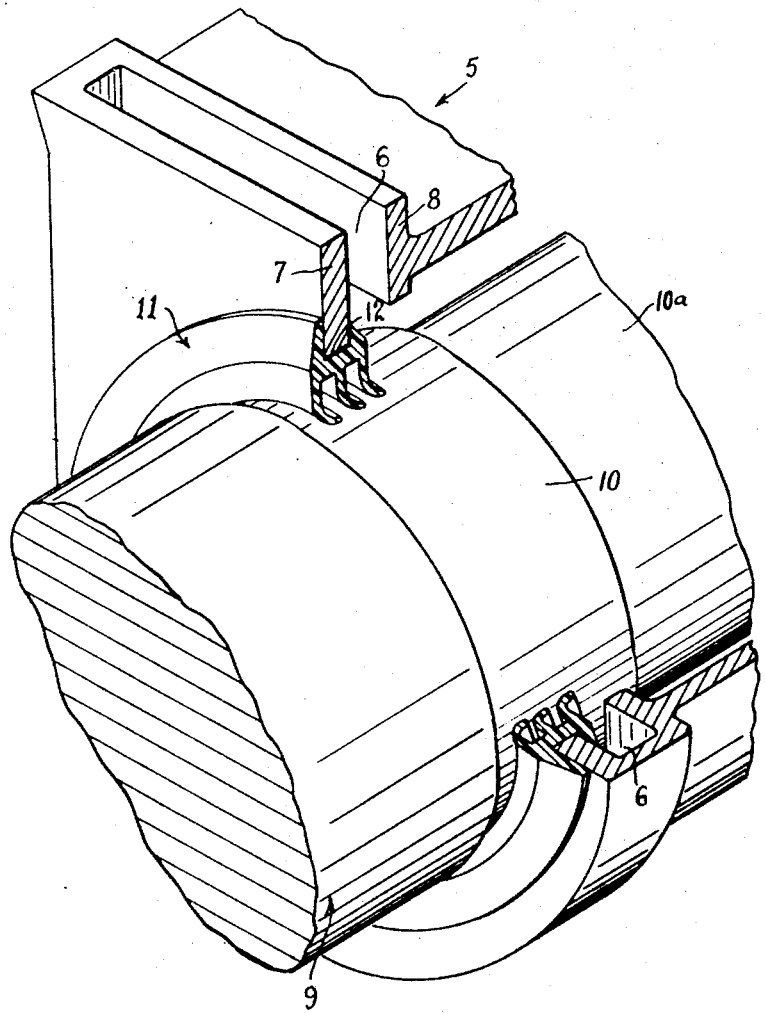
FIGURE 1 is a fragmentary perspective view, partly in section, showing a portion of the journal box, car axle and the rear seal of the invention.

Referring now to the accompanying drawings in detail, and more particularly to FIGS. 1–6 thereof, the journal box 5 is of a conventional construction, having a dust guard well 6 defined by the rear wall 7 and inner wall 8.

A car axle 9 is provided with a dust guard seat 10 and with a journal portion 10a, the dust guard seat 10 being disposed on the axle so as to take a position aligned with the dust guard well 6 when the journal is projected into the journal box 5.

The annular rear seal 11 of the invention is adapted to be fitted on the inner peripheral edge 12 defining an opening in the rear wall 7 of the well 6 through which the axle 9 is passed.

The seal 11 is moulded from a suitable rubber-like elastomer which will stand up to a wide variation in temperature encountered under severe operating conditions. The seal 11 has an annular body 13 with integral, radially outwardly projecting walls 14, 15 forming therebetween an annular channel or groove 16. The base of the groove 16 is wide enough to compensate for casting variations.

In order that the seal 11 may grip tightly on the surfaces of the rear wall 7 of the dust guard well 6, the walls 14, 15 are mutually convergent in the manner shown in FIG. 5.

Since the rear seal 11 is intended to be installed by being pushed inwardly through the opening in the rear wall 7 as indicated by the arrow A in FIG. 2, the wall 15 is of a smaller diameter than the wall 14 and has a bevelled surface 17 to facilitate pressing of that wall past the peripheral edge 12 of the opening in the rear wall 7. The outer peripheral wall 14 of the seal, being of greater radial depth than the wall 15, provides a maximum frictional contact with the adjacent surface of the rear wall 7 and, together with the frictional grip provided by the wall 15, securely anchors the seal on the wall 7 so that rotation of the seal relative to the journal box is prevented.

The annular body 13 of the seal is also integrally provided with a plurality of radially inwardly projecting sealing rings or ribs 18. These ribs have considerable radial depth and are axially spaced so as to form an annular dust pocket 19 between every two adjacent ribs, thus providing a multiple or labyrinth type seal. The ribs 18 are inherently resiliently flexible and have a tapered cross-section progressively decreasing in thickness from the inner circumferential edge of the seal body 13 to the inner marginal edge 20 of the ribs, thus affording increased flexibility at the contact of the ribs with the dust guard seat 10 of the axle, in combination with maximum strength at the juncture of the ribs with the seal body 13.

The radial depth of the ribs 18 is such that their inner marginal edge portions 20 may flex readily into a curved form as shown in FIGS. 1 and 2, so that the curved rib portions 20 sealingly engage the dust guard seat 10 with a wiping contact at one side of the portion 20 of each rib, regardless of any displaced position which the axle dust guard seat 10 may assume relative to the peripheral edge 12 of the opening in the box wall 7.

While the drawings show the seal as being provided with three sealing ribs 18 and two dust pockets 19 therebetween, manifestly, only two or more than three ribs may be provided, as desired.

The seal 11 as described is intended to be installed on the rear wall 7 of the box 5 before fitting the axle journal in the box, in which event the seal may be circumferentially continuous. However, if it is preferred to install the seal while the journal is already in place in the box, the seal may be radially split as shown in FIG. 6 to provide a tongue and groove joint with abutting ends 21, 22, the particular shape of this joint safeguarding against leakage of oil from the journal box. The ends 21, 22 of the seal are brought together around the axle 9 and the seal is then pressed into position between the dust guard seat 10 and the edge of the opening 12 in the box wall 7, the edge 12 firmly holding the ends 21, 22 in abutment when the seal is installed.

In either event, during installation of the seal, it is placed against the outer surface of the rear wall 7 with the wall 15 of the seal substantially aligned with the peripheral edge 12 of the wall 7. The seal is then pressed inwardly into the opening in the wall 7, the bevelled surface 17 of the seal wall 15 permitting the wall 15 to be readily deflected and passed beyond the edge 12, whereupon the wall 15 springs back into position when it has passed through the opening. If the wall 15 should not spring back at once, it may be assisted by flexing the outer wall 14 away from the wall 7 and giving an added push to the seal body 13.

Inasmuch as the sealing ribs 18 at their inner marginal edges 20 have a considerably smaller diameter than the dust guard seat 10 of the axle, they will readily flex and assume the curved position as shown in FIGS. 1 and 2. This curvature of the rib portions 20 places the wiping contact on one side thereof as already mentioned, and in combination with the intermediate dust pockets 19 a labyrinth type seal is provided between the dust guard portion 10 of the axle and the rear wall 7 of the journal box. Thus an optimum axial length of the seal can be provided on the dust guard seat without regard to the axial width of the dust guard well 6, and the resilient flexibility of the sealing ribs 18 affords a wide variation in the flexure of their inner edge portions 20 against the dust guard seat as the journal assumes varying positions relative to the journal box.

Since the seal is circular and is fitted in the substantially circular opening in the box wall 7, it does not require to be fitted on the wall 7 in any particular manner with respect to the top, sides or bottom of the journal box. Also, when installed in the journal box opening, the seal provides a flexible cushion between the box and the axle when the box is being fitted on the journal, thus protecting the highly polished surface of the journal against damage.

Attention is now directed to the modified embodiment of the seal shown in FIGS. 7–13 and designated by the numeral 11a. For most efficient operation of the seal under all conditions it is essential that the annular rings or ribs of the seal maintain contact with the dust guard seat 10 of the axle in all positions of the axle relative to the journal box, with a minimum of pressure but sufficient to maintain a proper seal. Such minimum pressure between the rings or ribs and the dust guard seat may be obtained by increasing the circumferential length of the inner marginal edges of the ribs, as presently described.

The seal 11a has an annular body 13a with the outwardly projecting walls 14a, 15a forming an annular channel or groove 16a therebetween, as in the seal 11. The body 13a is also provided with a plurality of axially spaced, radially inwardly projecting annular rings or ribs 18a, forming an annular dust pocket 19a between every two adjacent ribs. As in the instance of the ribs 18, the ribs 18a have a considerable radial depth and are radially inwardly tapered in thickness, for maximum flexibility at their inner marginal edges 20a combined with maximum strength at their juncture with the seal body 13a.

The basic cross-section of the seal 11a is shown in FIG. 10, but in order to increase the circumferential length of the inner edges 20a of the ribs as already mentioned, the ribs are moulded to a corrugated, undulated or wave-like configuration, the undulations extending circumferentially of the seal with their amplitude oriented in the axial direction, as will be apparent from FIGS. 9 and 13. Thus, starting with the basic cross-section of FIG. 10, the sealing ribs 18a extend from the mid-portion of the body 13a and their corrugated or undulated form indicated at 25 causes them to be axially offset alternately in one direction and the other as shown in FIGS. 11 and 12, with the outer portions of the undulations 25 disposed substantially in the vertical planes of the outer faces of the body 13a, while the inner portions of the undulations are disposed substantially in the central medial plane between the outer faces of the body.

As will be noted in comparison of FIGS. 10, 11 and 12, the angled radial depth $L^2$ and $L^3$ of the undulated sealing ribs 18a is greater than the radial depth $L^1$. This construction permits a greatly increased developed length of the edges 20a without affecting the diameter C (FIG. 8), which is somewhat less than the diameter of the dust guard seat 10. When the dust guard seat 10 is fitted into the opening in the rear wall 7 of the box 5 and the axle is passed through the seal so that the dust guard seat 10 is aligned with the seal, the undulated ribs 18a will flex in the axial direction into a curved form so that the marginal edge portions 20a straighten out slightly as shown in FIG. 7, thus providing a wiping contact at one side of the rib portions 20a with a slight pressure against the dust guard seat 10, but sufficient for a proper sealing effect. A limitation to increase of pressure of the ribs 18a on the dust guard seat is due partly to the undulation of the sealing ribs and partly to the increase of radial lengths $L^2$ and $L^3$ in comparison to $L^1$.

As the axle moves off center in any direction, the undulated rings 18a will adjust themselves to that, so that as the pressure transmitted from the axle lessens on one side, the undulations will deepen on that side while on the opposite side the undulations will tend to straighten out. This has the effect of maintaining a constant contact between the axle and the sealing ribs around the whole circumferential surface of the axle at the dust guard seat 10.

It will be also observed that the undulated ribs 18a join the seal body 13a with a radius of curvature at the base of the dust pocket 19a, which curvature flows smoothly in the transition of the ribs from one axial direction of undulation to the other and also safeguards against possible cracking or distortion of the seal in this area.

Finally, FIG. 14 illustrates the cross-section of a modified form of the seal, wherein only one undulated sealing rib 18a is provided.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. The combination of a railroad car journal box having a rear wall and an inner wall defining a dust guard well therebetween, said rear and inner walls being provided with aligned openings and the opening in the rear wall being substantially circular, a car axle having a journal in said box and also having a dust guard seat adjacent the journal, said dust guard seat being smaller in diameter than said rear wall opening and extending through the rear wall opening into the dust guard well of the box, and a labyrinth type seal for said box, said seal being formed integrally from elastomeric material and comprising an annular seal body having inner and outer circumferential edges, said seal body being provided in its outer circumferential edge with an annular groove having frictionally seated therein the inner peripheral portion of said rear wall surrounding the rear wall opening, and a plurality of inwardly projecting annular sealing ribs provided in axially spaced relation on the inner circumferential edge of said seal body and defining therebetween at least one annular dust pocket open inwardly toward the dust guard seat of the axle, said sealing ribs being inherently resiliently flexible and having a tapered cross-section progressively decreasing in thickness from the inner circumferential edge of the seal body to the inner marginal edge of the ribs, said sealing ribs being circumferentially undulated in the axial direction and axially offset alternately from a medial plane, whereby to afford a greater circumferential length at the inner marginal edges of the ribs, said greater circumferential length of the rib allowing the ribs to accommodate themselves to maximum movement of the journal relative to the axis of the openings in the journal box.

2. The combination as defined in claim 1 wherein said seal body is radially split and provided at its split ends with an abutting tongue and groove joint.

3. The combination as defined in claim 1 wherein said seal body has side faces spaced apart by the axial dimension of the body, the axial amplitude of undulation of said sealing ribs extending substantially from the planes of said side faces to a central medial plane therebetween.

4. The combination as defined in claim 3 wherein said sealing ribs have relatively thick base portions connected to the seal body in axially inwardly spaced relation from the planes of said side faces.

5. The combination as defined in claim 4 wherein the relatively thick base portions of said sealing ribs are formed to provide a radius of curvature at the base of said dust pocket between the ribs.

6. The seal as defined in claim 9 wherein said seal body has side faces spaced apart by the axial dimension of the body, the axial amplitude of undulation of said sealing ribs extending substantially from the planes of said side faces to a central medial plane therebetween.

7. The seal as defined in claim 6 wherein said sealing ribs have relatively thick base portions connected to the seal body in axially inwardly spaced relation from the planes of said side faces.

8. The seal as defined in claim 7 wherein the relatively thick base portions of said sealing ribs are formed to provide a radius of curvature at the base of said dust pocket between the ribs.

9. A labyrinth type seal for use on a car axle dust guard seat in a rear wall opening of a journal box, said seal being formed integrally from elastomeric material and comprising an annular seal body having inner and outer circumferential edges, said seal body being provided in its outer circumferential edge with an annular groove for seating the opening edge portion of a journal box rear wall, and a plurality of inwardly projecting annular sealing ribs provided in axially spaced relation on the inner circumferential edge of the seal body and defining therebetween at least one annular dust pocket, said sealing ribs being inherently resiliently flexible and having a tapered cross-section progressively decreasing in thickness from the inner circumferential edge of the seal body to the inner marginal edge of the ribs, said sealing ribs being circumferentially undulated in the axial direction and axially offset alternately from a medial plane, whereby to afford a greater circumferential length at the inner marginal edges of the ribs, said greater circumferential length of the ribs allowing the ribs to accommodate themselves to maximum movement of the journal relative to the axis of openings in the journal box.

References Cited

UNITED STATES PATENTS

| 2,768,012 | 10/1956 | Klingler | 277—178 |
| 2,897,533 | 8/1959 | Bull et al. | 277—178 X |
| 2,958,551 | 11/1960 | Rogers | 277—134 X |
| 3,027,167 | 3/1962 | Liebig | 277—199 X |
| 3,183,009 | 5/1965 | Kunel | 277—208 |
| 3,194,571 | 7/1965 | Peickii et al. | 277—208 X |

FOREIGN PATENTS

| 545,437 | 5/1942 | Great Britain. |
| 1,339,675 | 9/1963 | France. |

SAMUEL ROTHBERG, *Primary Examiner.*

U.S. Cl. X.R.

277—134, 208